United States Patent [19]
Andresen et al.

[11] Patent Number: 4,975,948
[45] Date of Patent: Dec. 4, 1990

[54] RAPID DIALING METHOD FOR TELECOMMUNICATIONS

[76] Inventors: Dennis R. Andresen, 13539 Paseo Terrano, Salinas, Calif. 93908; Jeffrey R. Cohen, 243 Asilomar Blvd., Pacific Grove; Donald V. Z. Wadsworth, 260 Asilomar Blvd., Pacific Grove, both of Calif. 93950

[21] Appl. No.: 423,548

[22] Filed: Oct. 13, 1989

[51] Int. Cl.5 ............................................. H04M 1/27
[52] U.S. Cl. ..................................... 379/355; 379/359
[58] Field of Search ................ 379/355, 356, 359, 216

[56] References Cited

U.S. PATENT DOCUMENTS 3,757,054 10/1971 Harries .............................. 179/90 B
4,535,204 8/1985 Hughes et al. ...................... 379/355
4,644,107 2/1987 Clowes et al. ...................... 379/355

FOREIGN PATENT DOCUMENTS 2939196 4/1981 Fed. Rep. of Germany ...... 379/354

Primary Examiner—Stafford D. Schreyer

[57] ABSTRACT

A printed telephone number in either numerical (OCR-readable) or standard bar code format can be dialed rapidly and accurately by scanning the number with a hand-held optical sensor or wand. The OCR or bar code wand output is connected to an automatic dialing apparatus that includes a processor, signal generator, and interface circuit. The processor decodes the wand output and translates the call number digits into digital control signals. The control signals drive a signal generator that outputs the call number address digits in the form of tone bursts, typically DTMF tones. The signal generator output is coupled either electrically or acoustically to the microphone input of a telephone set speech circuit. The telephone set then transmits the tone signals over the telephone line. No modification of the telephone set is required since the automatic dialing apparatus, including the hand-held wand, interfaces with the telephone set using either existing modular connectors or acoustic coupling. The call numbers, together with any bar code symbols, can be pre-printed in a directory, on file cards, on documents, or on adhesive labels using available printers.

13 Claims, 3 Drawing Sheets

RAPID DIALING METHOD FOR TELECOMMUNICATIONS

BACKGROUND OF INVENTION

This invention relates to telecommunications over a multiparty network wherein a circuit is established between two or more parties (terminals) by means of call codes or call numbers or call addresses which are dialed by the caller. In particular, it relates to a method and apparatus, associated with the caller's installation, for rapid, error-free dialing of the call numbers that have been pre-printed, possibly in coded form, and stored in a directory, on file cards, documents, adhesive labels, or other media.

BACKGROUND—PRIOR ART

Manual dialing by means of keypad pushbuttons or a rotary dial is a relatively slow and error-prone process. It is especially inefficient for businesses and individuals who have a large volume of reptitive, outgoing calls—as is the case for many professionals, distributors, salesmen, etc. For these users, a number of devices are available on the market that are intended to overcome the disadvantages of manual dialing.

One available method for automating the dialing applies to the user who stores his clients' files and telephone numbers in a computer database. He simply adds automatic dialing or calling software and a telephone interface to his computer. Then when he displays the client's file (including the telephone number) on the monitor screen, he can automatically dial the number by merely pressing a keyboard button.

Computer-dialing is a cost-effective solution for the user with computerized records and a terminal at his desk. It does not meet the need of a large number of users who either do not have a computer or whose client files or telephone directories are maintained on hardcopy media such as paper, cardboard, or plastic. Fdr these, the available automatic dialing devices have serious limitations. Several examples will be described.

One example is the repertory telephone set or call director that can be programmed with, typically, 32 to 256 numbers in its electronic memory and permits single pushbutton dialing. Another is the acoustically-coupled, pocket-size repertory dialer that emits audible dial tones into a telephone mouthpiece when a pre-recorded number is selected from the dialer's electronic memory. These are popular for personal and inter-office use with a limited list of telephone numbers. For many businesses these devices have the serious operational disadvantage that two separate, incompatible databases must be maintained and updated: the client's or patient's hardcopy file and the electronic telephone memory.

U.S. Pat. No. 3,757,054 that issued Sept. 4, 1973 to Harries is an example of an apparatus that could perform automatic dialing directly from a hardcopy file. Harries' implementation, based on older technology, is slow and physically awkward to use. It applies only to dial-pulse address signaling telephone systems and not to the modern tone-dialing systems.

Harries' apparatus has no buffer between the optical scanning of the telephone number and the signaling over the telephone network. Consequently the scanning rate must meet the pulse timing specifications of the telephone network: approximately 10 pulses per second for each call number digit with a 0.8 second space between digits. Since manual scanning would be too imprecise, Harries' apparatus requires an automatic scanning mechanism. This is a motor-driven scan head that requires approximately 18 seconds per 10-digit telephone number.

In order to simplify the decoding process, Harries' apparatus utilizes an inefficient, single-width bar code to represent the telephone numbers. As a result, the bar code symbol (pattern) for a 10-digit telephone number occupies a strip 180 mm (7 inches) long. The strips can be mounted alongside the subscribers' names in a telephone directory, but the resultant directory is not very compact due to the size of the strips.

Harries' apparatus has no capability for detecting reading errors, either due to misplacement of the scan head or poor quality printing of the bars. He provides for detection of a unique end-of-scan bar to stop the pulse-dialing but there is no automatic means for determining whether the user placed the scan head at the beginning of the bar code symbol. His simple bar code is not self-checking.

The use of bar code wands for data input to computers, point-of-sale terminals, etc. is widespread. Optical character recognition (OCR) hand-held scanners for data input are also coming on the market ("The Data Sweep Pencil Wand" in ID Systems, Nov. 1988). As yet, there are no devices on the market for automating the dialing of telephone call numbers printed on hardcopy media such as directories, documents, file cards, or adhesive labels.

BACKGROUND—OBJECTS AND ADVANTAGES

An object of this invention is to provide a method and apparatus that enable a caller to automatically and rapidly dial a telephone call number printed, possibly in coded form, on hardcopy media such as a telephone directory, a document, a file card, or adhesive label.

Another object is to provide a method and apparatus that enable a caller to automatically dial a client's or patient's telephone number that is stored on the same hardcopy media as his other records, avoiding the need to maintain two separate data bases.

Another object is to enable the rate of scanning of the call number, that is printed on hardcopy media, to be independent of the timing of the address signaling tones or pulses, avoiding the need for a constant-rate automatic scanning means.

Another object is to provide essentially error-free automatic dialing of telephone call numbers printed on hardcopy media such as a directory, document, file card, or adhesive label.

Another object is to enable the automatic dialing apparatus, including the wand, to interface with the user's existing telephone set without modification to the latter.

A client's or patient's telephone number can be printed (either in OCR characters or as a bar code symbol) on the same file card or document as his other data. Under the invention, the number can be dialed directly from the file card or document by scanning it with a hand-held wand. Heretofor, a client's or patient's file had to be stored on one medium (such as a card file or a document), and his telephone number stored in another medium (such as the electronic memory of a repertory telephone set, the electronic memory of an acoustically-coupled dialer, or Harries' 180 mm long paper strips).

The automatic dialinf method of the invention applies not only to voice networks but also to teletype, facsimile, data, and video communications networks. The method applies not only to the call address digits but also can include pauses and custom call feature characters (such as * and #) in the automatic dialing.

SUMMARY OF THE INVENTION

To accomplish rapid, error-free telephone dialing according to the invention, the caller first places his telephone set in the off-hook state (by lifting the handset or otherwise) and listens for dial tone. Then he scans a hand-held optical sensor or wand over a pre-printed telephone call number. The wand output is connected to a processor that decodes the sensor output into character bit images, detects the call number's start/stop characters, and performs error-checking. In the case of a valid read, the processor may provide an audible or visual acknowledgment to the caller.

In the case of tone address signaling systems, the processor transmits the call address data to a dual-tone multi-frequency (DTMF) generator circuit that, in turn, transmits the appropriate tone address signals over the telephone network.

The DTMF generator output may be either acoustically coupled to the telephone mouthpiece or electrically connected to the microphone input of the telephone speech circuit.

In the case of an OCR wand, the call numbers must be printed in OCR-readable characters. In the case of a bar code wand, the number must be printed as a standard bar code symbol. The call numbers (including any bar code symbols) can be pre-printed in a telephone directory, on file cards, on documents, or on adhesive labels, using available printers or typewriters.

DETAILED DESCRIPTION

Figure 1:
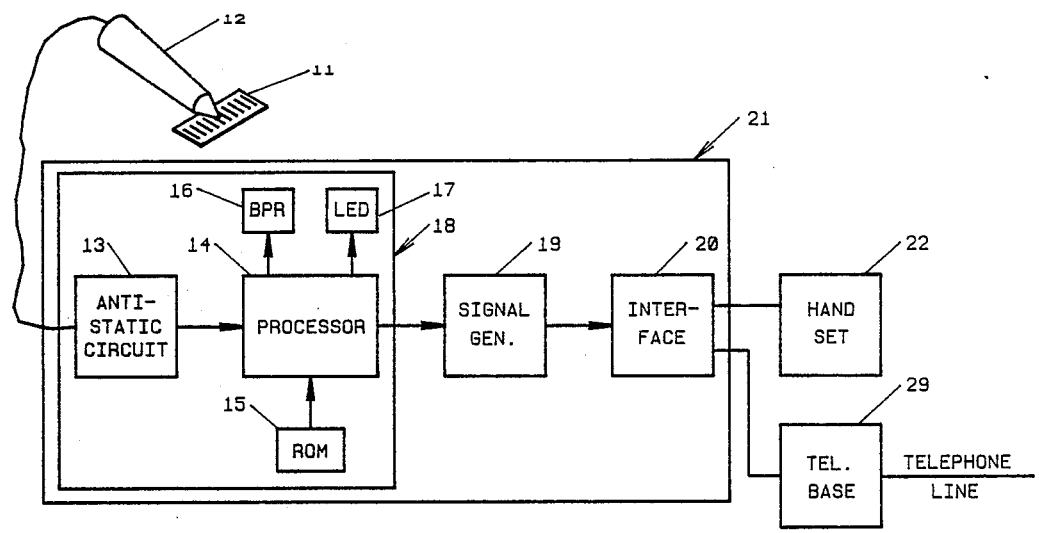
FIG. 1 is a block diagram illustrating the interconnections among the elements involved in the automatic dialing apparatus for practicing the invention.

The dialing method of the invention can be implemented, for DTMF address signaling, as illustrated in block form in FIG. 1. The connecting lines with arrowheads indicate the paths and directions of information flow. The pre-printed call number 11 is scanned by a hand-held optical sensor or wand 12 that consists of a light source, photo-detector(s), and signal conditioning circuitry. If the number is printed in an OCR type font, an OCR wand is used. If the number is printed as a bar code symbol, either a hand-held, moving-beam laser scanner or a hand-held contact wand can be used.

The wand 12 output signals are transmitted via a connecting cable to an automatic dialing apparatus 21. The signals are then read by a processor 14 that is protected by an antistatic interface circuit 13. The processor 14 is controlled by a signal processing program stored in permanent read-only memory (ROM) 15.

The processor 14 samples and decodes the wand output signals into character bit images that are stored in the processor's random-access memory (RAM). This being a digital processor, the information is stored and transmitted in discrete pieces or bits, short for BInary digiTS. Each bit has only two possible values: either a "1" or a "0". Within an allotted time slot, a "1" may be represented by the presence of a pulse above a certain amplitude level, and a "0" by the absence of a pulse. Several bits together represent each character or decimal digit of the call number.

The processor examines the stored character bit images to determine whether a valid call number symbol has been read. The validity criteria include (a) identification of unique start and stop characters (patterns), (b) ackowledgment that the character bit images are valid (only 10 out of a possible 32 combinations of 5-bit images are valid for the Interleaved 2-of-5 Bar Code that is said to be "self-checking" for this reason), and (c) examination of an (optional) message checksum character, located at the end of the bar code symbol. The value of this character is used by the processor to determine whether there may be substitution errors or missing digits in the call number "message". The checksum was previously calculated from the call number digits and printed as part of the bar code symbol. It is recalculated by the processor from the wand data and the new value compared with the value contained in the decoded bar code symbol. Any discrepancy indicates an error.

In case of a valid read, the processor provides feedback to the caller by means of a beeper (BPR) 16 tone and/or a flashing LED (light-emitting diode) 17. Alternatively, the call number can be displayed on an LCD, plasma, or other display device.

In the case of a valid read, the processor translates the binary data representing the successive call address digits into digital control signals. These signals cause a signal generator circuit 19 to transmit the address signaling information, including required pauses between the digits, via an interface circuit 20 to the modular telephone. The automatic dialer circuitry (13–20) can be housed in a separate apparatus 21.

Figure 2:
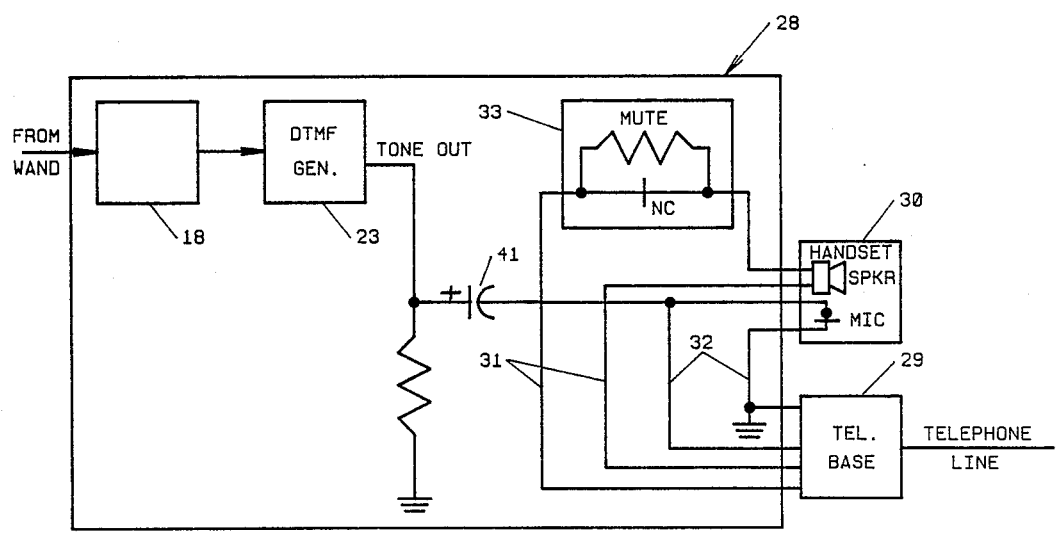
FIG. 2 is a partly block, partly schematic diagram illustrating DTMF signaling with a separate automatic dialing apparatus connected between the handset and base of a modular telephone.

The implementation for practicing the invention, illustrated in FIG. 2, applies to any DTMF modular telephone set. The dialing circuits are housed in a separate apparatus 28 from the telephone set and require either batteries or a standard ac/dc power adapter. No modification to the modular set is required except to connect the dialing apparatus 28 between the base 29 and the handset 30, using the cord supplied with the modular set and one additional standard cord. Each of the thin lines in FIG. 2 represents a single conductor. The handset speaker 31 and microphone 32 signal paths are routed through the apparatus 28. The DTMF generator 23 tone output is bridged onto the microphone path, via capacitor 41. The generator's mute control output (not shown) operates a mute circuit 33 that inserts additional loss in the speaker path during signaling.

During the telephone speech mode, the mute circuit resistor is bypassed by the normally-closed (NC) switch.

Figure 3:
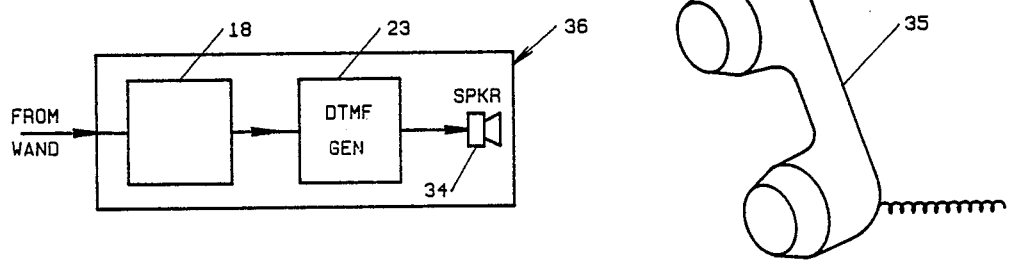
FIG. 3 illustrates DTMF signaling via acoustic coupling between the automatic dialing apparatus and the telephone.

Another DTMF implementation useful for practicing the invention is illustrated in FIG. 3. The tone generator 23 output drives a speaker 34 that couples acoustically to the telephone mouthpiece 35. The dialing apparatus 36 is a separate apparatus from the telephone set and requires its own power supply (battery or ac/dc adapter).

DESCRIPTION—DIALING APPARATUS EXAMPLE

Figure 4:
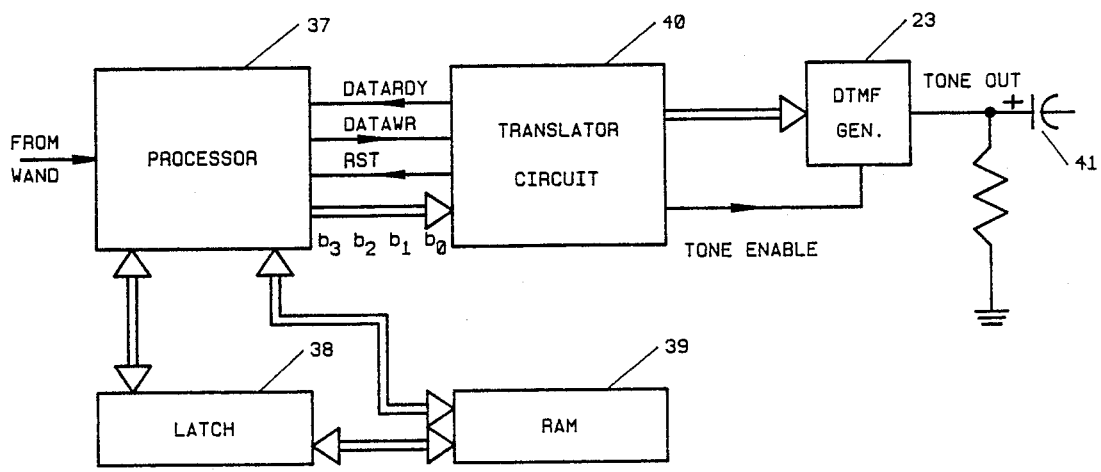
FIG. 4 is a circuit diagram of an automatic dialing apparatus for interfacing a bar code wand to a modular telephone in practicing the invention.

An apparatus useful for implementing automatic dialing, according to the invention, is illustrated in the circuit diagram of FIG. 4. Each thin line represents a single conductor signal path with the direction of data flow indicated by arrowheads. Multiple conductor signal paths are indicated by double lines. Although this example applies to a bar code wand input, the same approach applies to other inputs including OCR.

Figure 5:
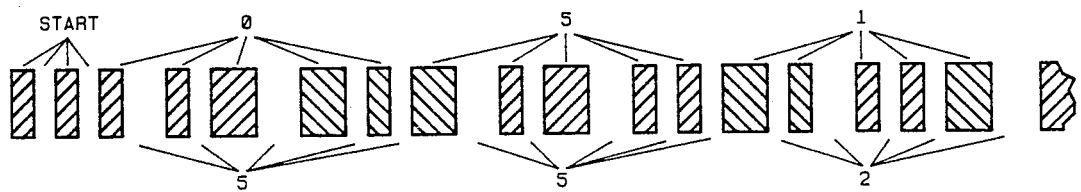
FIG. 5 illustrates the compact "Interleaved 2-of-5" barcode representation of a call number, suitable for a directory listing

The call address number to be read by the apparatus of FIG. 4 may be any length. The number is assumed to be coded as a standard "Interleaved 2-of-5" bar code symbol, illustrated in FIG. 5 for the information number 555-1212. Other bar codes could be used, but the Interleaved 2-of-5 provides the most compact symbol and corresponding label. A 10-digit call number can be represented by a medium-resolution label that is only 30 mm (1.25 inches) long. The bar code label's height should be no less than 20 percent of the length, 6 mm (0.25 inches) in this case, to assure a high first read rate. This compact label can be printed by a low-resolution dot matrix printer (80 dots per inch).

The Processor 37 illustrated in FIG. 4 is a commercially-available microcontroller. It is controlled by a program, resident in its ROM memory, that performs the following functions:

(a) detect the bar code symbol margin and start character pattern.

(b) measure the data pulse widths from the wand output.

(c) decode the pulse widths into character bit images.

(d) performa character (digit) error check of the bit image.

(e) convert each binary-coded bit image to an ASCII (American Standard Code for Information Interchange) binary code.

(f) perform a total call number error check by verifying the checksum.

(g) detect the stop character.

(h) provide operator feedback in case of a valid "read"; otherwise reset the decoder for the next scan.

(i) output the ASCII-coded characters in parallel binary format (the serial interface option was not selected). Each character (digit) is transmitted sequentially on receipt of a DATARDY signal at the beginning of each cycle of a tone-burst timing clock. Start/stop characters are suppressed.

(j) terminate the call number address by transmitting the ASCII character for "carriage return" or CR (other options are available).

Further details of the above logic functions, including logic flow charts, are described in Hewlett Packard Application Notes 1014 (Microprocessor-Based Bar COde Decoder Design) and 1013 (Elements of a Bar COde System). The decoder IC is described in Hewlett Packard Technical Data sheet "Component Bar Code Readers" dated July 1984 and Manual Part No. 5958-5201 "HBCR-1000 Series Component Bar Code Readers Users Manual" dated Sept. 1985.

Since the call number contains only digits (numbers), the 4 least significant bits of the 7-bit ASCII codes representing the digits are sufficient for identification. Consequently only four parallel lines, representing the 4 bits, are required to transmit the Processor 37 signal output to the DTMF Generator 23. According to the usual convention, the 4-bit word representing each call digit is designated, in FIG. 4, by b3b2b1b0 where b0 is the least significant bit. Thus, for example, the ASCII code for the digit 7 corresponds to b3=0, b2=1, b1=1, and b0=1.

The available microprocessor-based bar code decoders cannot communicate directly with the available DTMF generator or dial-pulse generator circuits. Besides other incompatibilities, the decoder output is in ASCII code while the generators expect keypad-type code input. Consequently a translator was designed by the inventors specifically for interconnecting the HBCR-1900 to the TP5088 DTMF generator. The TP5088 is described in the National Semiconductor Corporation "Telecommunications Databook", 1987 edition.

Figure 6:
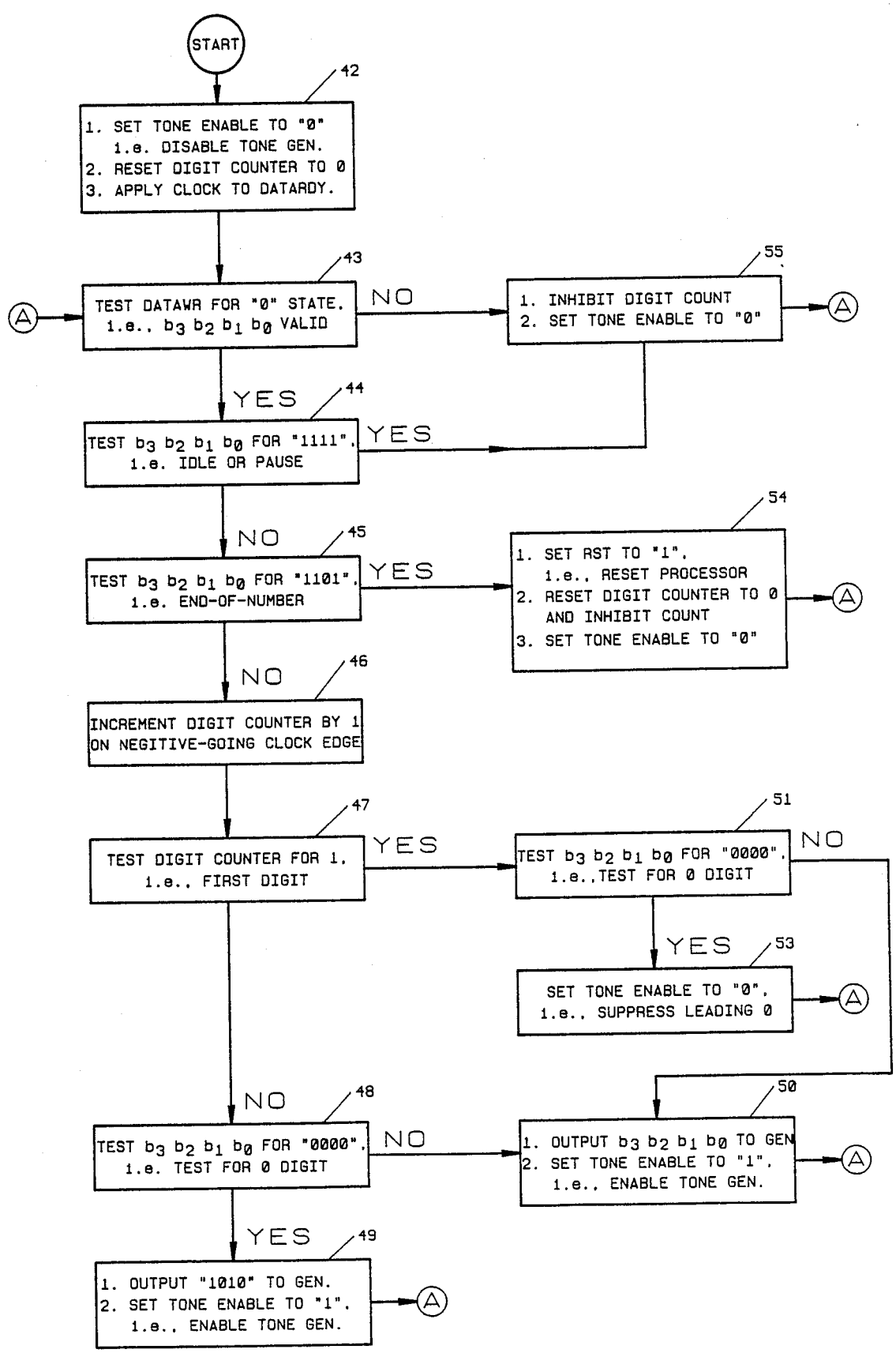
FIG. 6 is a logic diagram useful for programming the translator between an available microprocessor-based bar code decoder and an available DTMF generator, in practicing the invention.

A logic diagram useful for performing the translator functions is shown in FIG. 6. The logic may be implemented in a single custom microprocessor chip properly programmed to reflect the logic diagram, or by well-known logic circuits permanently wired to perform the indicated logic. Either implementation is represented by the Translator Circuit 40 in FIG. 4. The symbols A in FIG. 6 indicate a logic connection from block 49, 50, 53, 54, Or 55 to block 43.

The first step, block 42 of the logic diagram of FIG. 6, is to initialize the logic functions by setting the TONE-ENABLE input of the Generator 23 to a logic "0" state that disables the tone generation, setting a call number digit counter to zero (0), and driving the DATARDY input of the Processor 37 from a square-wave clock.

The digit counter is needed to identify and suppress any leading zero (required in the bar code symbol) that precedes the call number digits. The clock period, approximately 120 milliseconds, determines the spacing between successive tone bursts. During the half-period that the clock forces DATARDY to the logic "0" state, the Processor 37 will output the binary word representing the digit currently in its output buffer, providing there has been a good read. During the half-period that the clock forces DATARDY to the logic "1" state, corresponding to pauses between tone bursts, the Processor outputs the idle code b3b2b1b0=1111.

The DATAWR output of the Processor 37 is tested in block 43 to determine if the output word b3b2b1b0 is valid. If so, the output is tested in block 44 to see if it is the idle or interfigital pause code, 1111. If not, the output word is tested in block 45 to see if it is the end-of-message code 1101, corresponding to the lower 4 bits of the ASCII character for carriage return (CR).

If the block 45 test is negative, then in block 46 the digit counter is incremented by 1 on the negative-going edge of the clock signal. Next the digit counter is tested in block 47 for a count of 1, i.e., for the first digit. If not the first digit, then the digit is tested in block 48 to see if it is a 0. If so, the corresponding binary word is converted in block 49 from 0000 to the 1010 code required to represent a 0 to the Generator 23. Otherwise, in block 50, the binary word for the digit is transmitted unchanged to the Generator.

If the block 47 test indicates the first digit is present, then it is tested in block 51 to see if it is a 0. If so, then it is a leading 0 and is suppressed in block 53 so that no tone is generated. If the first digit is not a 0, it must be a valid call digit and its binary word is transmitted unchanged via block 50.

If the block 45 test is affirmative, i.e., end-of-message, then in block 54 the Processor is reset for the next bar code scan by setting the RST input to the "1" logic state. The digit counter must be reset to 0 and further counting inhibited until implemented in block 46. Of course the tone generator is disabled when b3b2b1b0=1101.

If the block 44 test is affirmative, i.e., the idle state, then in block 55 the digit counter is inhibited and the tone generator disabled. Also if the block 43 test is negative, i.e., invalid data, then the digit counter is inhibited and the tone generator disabled.

Other DTMF generator circuits such as the NSC TP5089 can be accommodated by modifying the translator logic to translate the 4-bit ASCII codes to 8-bit logic levels that simulate key closures.

The bar code symbol for use with the apparatus of FIG. 4 does not contain a trailing check character, since this was found unnecessary. The error-checking function of the HBCR-1900 processor was found to be adequate in the case of the self-checking interleaved 2-of-5 Bar Code.

For the example, the dialing apparatus is interfaced to a modular telephone set as illustrated in FIG. 2. The tone output is bridged, via a coupling capacitor 41, onto the microphone input of the telephone base. If the handset speaker is to be muted during signaling (as specified in the Electronic Industries Association RS-496 standard), either the mute output or the tone output of the generator can control this functiOn.

In using the apparatus of FIG. 4, the caller scans the wand tip over the bar code label 11. In the case of a good read, he immediately hears a beeper tone or sees a flashing LED, followed by the DTMF tones from the handset speaker. Typically, the process takes about 1 second.

DESCRIPTION—PREFERRED IMPLEMENTATION

For mass production, the 5 integrated circuit chips (ICs) comprising the automatic-dialing apparatus circuit shown in FIG. 4 can be replaced by one or two ICs. One is a signal processor such as a microcontroller containing a masked ROM (read-only memory) program. This IC combines the functions of the Processor 37, its associated LATCH 38 and RAM 39 chips, timing, and the Translator Circuit 40 in one chip. The DTMF generator function might be included with the other functions in one IC or it could be implemented in a separate IC such as available from NSC.

The HPC 16000 series of microcontrollers offered by National Semiconductor Corporation can perform the signal processor function. Also single-chip digital signal processing devices offered by Texas Instruments, Analog Devices, Fujitsu, NEC Electronics, Zoran, an others are suitable.

The custom ROM program resident in the microcontroller performs many of the functions of the HBCR-1900 decoder, described in the references. However the custom ROM program is considerably simpler than that resident in the HBCR-1900, since only one bar code must be recognized, no external computer control is required, only a parallel interface option is required, and many other options are not needed. The custom ROM program also includes several of the logic operations implemented in the Translator Circuit 40, in particular, handshaking and leading zero suppression.

In the case of OCR input, a custom microcontroller or signal processor can perform the decoder and interface functions. In this case also, one or two ICs are sufficient for the dialing apparatus. With the present state of technology, the bar code implementation of the invention is preferable to OCR input. One reason is that the signal processing hardware is cheaper for the bar code input. Another reason is that bar code scanning typically has a higher first-read rate and greater data accuracy than OCR input.

We claim:

1. An apparatus that enables individuals and small business offices to rapidly and automatically dial telephone call address numbers of any length stored in a record file, comprising
    (a) an optical sensor with means for scanning or reading the call address numbers recorded in coded form,
    (b) a processor that receives the coded call address from said optical sensor and decodes the address digits into digital control outputs,
    (c) a signal generator that is controlled by said processor and that generates call address output signals including pauses,
    (d) and an interface circuit that couples the generator output to the microphone input of an available telephone set speech circuit whereby the common microphone input permits said apparatus to operate with multi-line as well as single-line telephones without modification to said telephones.

2. The dialing apparatus according to claim 1, in combination with a medium on which the coded calling information is recorded, said medium being one selected from the group consisting of a printed directory, a file card, a business card, a plastic credit card, a document, a label, a self-adhesive label, a stamped label, a back-lighted projection surface from a transparency, and a projection from a microfiche-type film whereby said medium is scanned by said optical sensor.

3. The dialing apparatus according to claim 1 wherein said signal generator is a dual-tone multi-frequency generator or DTMF generator.

4. The dialing apparatus according to claim 1 wherein said processor and said signal generator are combined into a custom, integrated-circuit device whereby the parts count and cost are reduced.

5. The dialing apparatus and medium according to claim 2 wherein any of the 16 keypad characters in addition to said call address numbers may be prerecorded in coded form and transmitted as DTMF tone bursts over the telephone network.

6. The dialing apparatus according to claim 1, in combination with a medium on which the coded calling information is recorded, said medium being one selected from the group consisting of a plasma display screen, a CRT display screen, and an LCD display screen.

7. The dialing apparatus according to claim 1 wherein said call address numbers are coded in the form of bar code symbols.

8. The dialing apparatus according to claim 1 wherein said call address numbers are coded in the form of OCR characters.

9. The dialing apparatus according to claim 1 wherein said optical sensor and scanning means consist of a hand-held wand that is used to manually scan the coded call address numbers.

10. The dialing apparatus according to claim 1 wherein said optical sensor is incorporated into a moving-beam scanner.

11. The dialing apparatus according to claim 1 wherein said interface circuit electrically couples the generator output to said microphone input of said telephone set speech circuit using only existing modular connectors whereby the efficiency of electrical coupling is obtained without modification to said telephone set.

12. The dialing apparatus according to claim 1 wherein said interface circuit acoustically couples the generator output to the handset receiver of said telephone set whereby no modification is required to said telephone set.

13. The dialing apparatus according to claim 12 wherein said dialing apparatus is housed together with the wand in a single hand-held device whereby the external connecting cord between the apparatus and the wand is eliminated.

* * * * *